United States Patent
Miyazaki

(10) Patent No.: US 8,459,320 B2
(45) Date of Patent: Jun. 11, 2013

(54) PNEUMATIC TIRE WITH TREAD HAVING CHAMFERED SURFACE

(75) Inventor: Tetsuji Miyazaki, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 372 days.

(21) Appl. No.: 12/740,773

(22) PCT Filed: Jun. 11, 2008

(86) PCT No.: PCT/JP2008/060645
§ 371 (c)(1),
(2), (4) Date: Apr. 30, 2010

(87) PCT Pub. No.: WO2009/060638
PCT Pub. Date: May 14, 2009

(65) Prior Publication Data
US 2010/0236679 A1    Sep. 23, 2010

(30) Foreign Application Priority Data
Nov. 6, 2007 (JP) ................................. 2007-288198

(51) Int. Cl.
*B60C 11/03* (2006.01)
*B60C 11/04* (2006.01)

(52) U.S. Cl.
USPC .................................................... 152/209.15

(58) Field of Classification Search
USPC ........................................ 152/209.15, 209.16
See application file for complete search history.

(56) References Cited

U.S. PATENT DOCUMENTS

| 5,105,864 A * | 4/1992 | Watanabe et al. ........ 152/209.18 |
| 5,656,107 A * | 8/1997 | Laurent et al. ........... 152/209.15 |
| 6,138,728 A | 10/2000 | Miyazaki |
| 6,983,777 B2 * | 1/2006 | Ratliff, Jr. ................. 152/209.15 |

FOREIGN PATENT DOCUMENTS

| EP | 0849101 A2 * | 6/1998 |
| JP | 09-142105 | 6/1997 |
| JP | 10-175406 | 6/1998 |
| JP | 11-227421 | 8/1999 |
| JP | 11-263104 | 9/1999 |
| JP | 2004-276861 | 10/2004 |
| JP | 2006062408 A * | 3/2006 |
| JP | 2006-151173 | 6/2006 |
| WO | WO 2008/064703 A1 * | 6/2008 |

OTHER PUBLICATIONS

Machine Translation of JP 2006-062408A. Japan, Ohashi et al., (No date).*

* cited by examiner

*Primary Examiner* — Steven D Maki
*Assistant Examiner* — Kendra Shin
(74) *Attorney, Agent, or Firm* — Fish & Richardson P.C.

(57) ABSTRACT

A pneumatic tire comprises grooves 1 to 3 formed in a tread and land portions 4 each having an acute angle portion 5 formed by the grooves 2 and 3. The acute angle portion 5 is chamfered by a plurality of chamfered surfaces 11 and 12 to form into a step shape by the chamfered surfaces 11 and 12 and a connecting surface 21 that connects the adjacent chamfered surfaces 11 and 12. Furthermore, from one sidewall to the other sidewall of the acute angle portion 5 at an end 6 of the acute angle portion 5, a height H1 of the chamfered surface 11 and a height H2 of the chamfered surface 12 are gradually decreased while a length L1 of the chamfered surface 11 and a length L2 of the chamfered surface 12 are gradually increased.

3 Claims, 6 Drawing Sheets

PNEUMATIC TIRE WITH TREAD HAVING CHAMFERED SURFACE

TECHNICAL FIELD

The present invention relates to a pneumatic tire with grooves formed in its tread and provided with land portions each having an acute angle portion. More particularly, it relates to a pneumatic tire with reduced air columnar resonance noise level while maintaining uneven wear resistance performance.

This application claims benefit of priority based on Japanese Patent Application No. 2007-288198 filed on Nov. 6, 2007, the entire same contents of which are incorporated by reference herein.

BACKGROUND ART

In a pneumatic tire, land portions are formed by a plurality of grooves formed in a tread. In order to achieve the desired performance, the land portion may be provided with an acute angle portion. For example, a portion sandwiched between two inclined grooves forms an acute angle portion in the pneumatic tire disclosed in Patent Document 1.

Since the acute angle portion of the land portion has low rigidity, a tip part thereof is subject to damage such as chips, tearing and the like. Even if it was not damaged, uneven wear would easily occur due to the low rigidity. In order to prevent such damage and uneven wear, the tip part is chamfered in such a way that a height of the land portion gradually becomes lower toward the end.

Patent Document 1: Unexamined Japanese Laid-Open Patent Publication No. 11-227421 (FIGS. 1 to 2)

DISCLOSURE OF THE INVENTION

Problem to be Solved by the Invention

In a state where a tire contacts the ground, tubular space is formed by a main groove extending in the tire circumferential direction and road surface. The rotation of the tire lets air compressed in the tubular space to release outside, and as a result, air columnar resonance noise is generated. The air columnar resonance noise is offensive noise whose frequency is 700 to 1400 Hz.

The tip part of the acute angle portion is chamfered in the above tire, thereby increasing flow velocity of the air flown in the groove, which results in increased air columnar resonance noise. On the other hand, an attempt to reduce air columnar resonance noise requires that chamfer amount be reduced and as a result, it becomes difficult to suppress the occurrence of uneven wear.

Therefore, the object of the present invention is to reduce the level of air columnar resonance noise while maintaining uneven wear resistance performance in the pneumatic tire provided with land portions each having an acute angle portion.

Means for Solving the Problems

The pneumatic tire of the present invention comprises grooves formed in a tread and land portions each having an acute angle portion formed by said grooves. The pneumatic tire is characterized in that said acute angle portion is chamfered by a plurality of chamfered surfaces and formed into a step shape by the chamfered surfaces and connecting surfaces that connect said adjacent chamfered surfaces.

If the volume of the chamfered portion is the same compared with a case where the acute angle portion is chamfered by one surface, the pneumatic tire has the same uneven wear resistance property. In addition, since the acute angle portion is chamfered by a plurality of chamfered surfaces each having a different height, wherein a step shape is formed by the chamfered surfaces and connecting surfaces that connect the adjacent chamfered surfaces, air flow in the grooves is disturbed by the step shape. As a result, air columnar resonance noise level can be reduced.

DESCRIPTION OF THE REFERENCE NUMERALS

| | |
|---|---|
| 1, 2 | circumferential grooves |
| 3 | groove |
| 4 | block |
| 5 | acute angle portion of land portion |
| 6 | lug groove |
| 7 | rib |
| 11, 12, 13 | chamfered surfaces |
| 21, 22 | connecting surfaces of chamfered surfaces |

BEST MODE FOR CARRYING OUT THE INVENTION

Figure 1A:
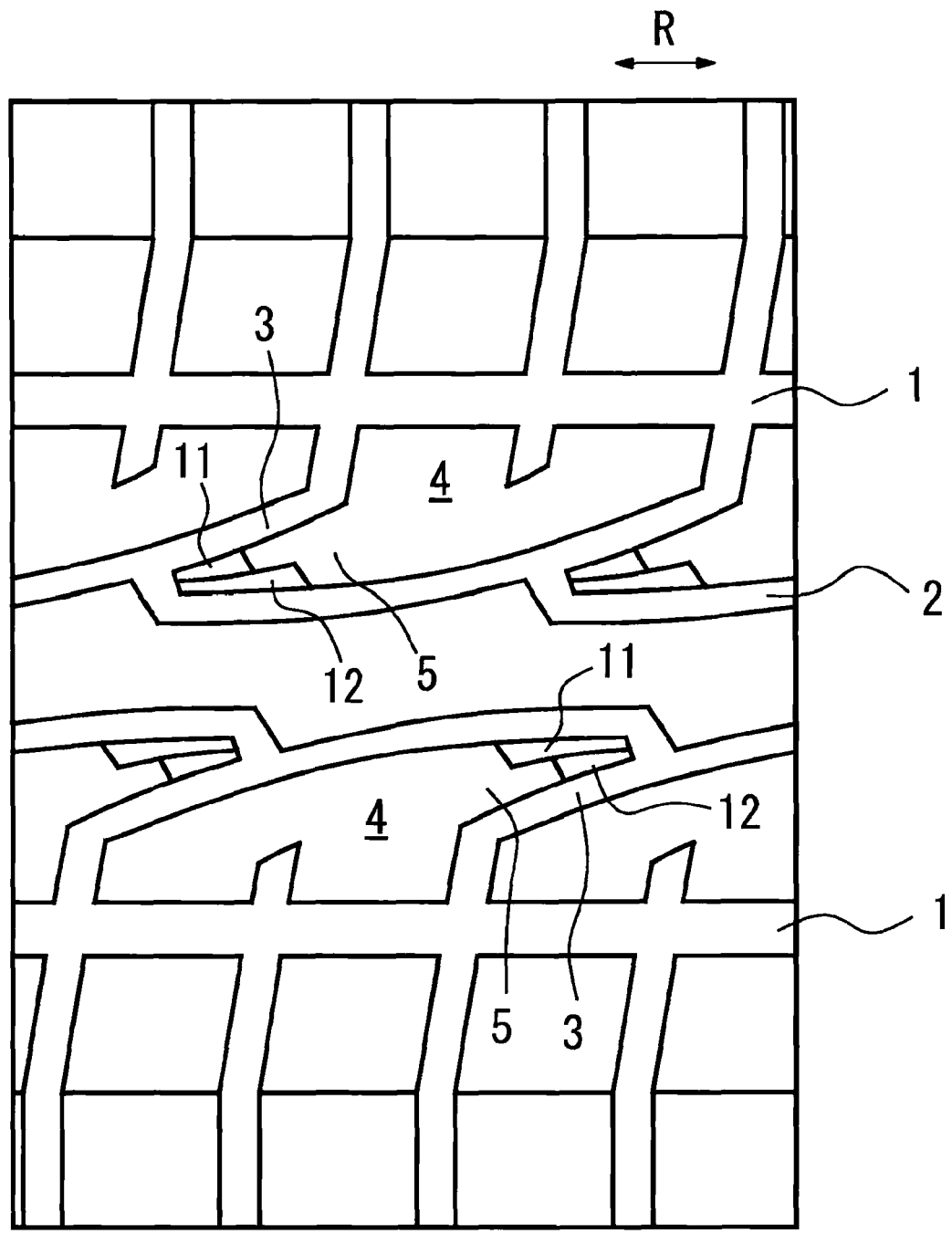
FIG. 1a is a view showing a tread pattern of the pneumatic tire related to the present invention.

Hereinafter, the embodiments for carrying out the pneumatic tire of the present invention are described with referent to drawings. FIG. 1a is a view showing a pattern of the pneumatic tire related to the present invention. The pneumatic tire has circumferential grooves 1 and 2 extending in the circumferential direction R and a groove 3 connecting the circumferential grooves formed in a tread, thereby forming a block 4. Moreover, an acute angle portion 5 of the block 4 is formed by the grooves 2 and 3 and the acute angle portion 5 is chamfered by a first chamfered surface 11 and a second chamfered surface 12.

Figure 1B:
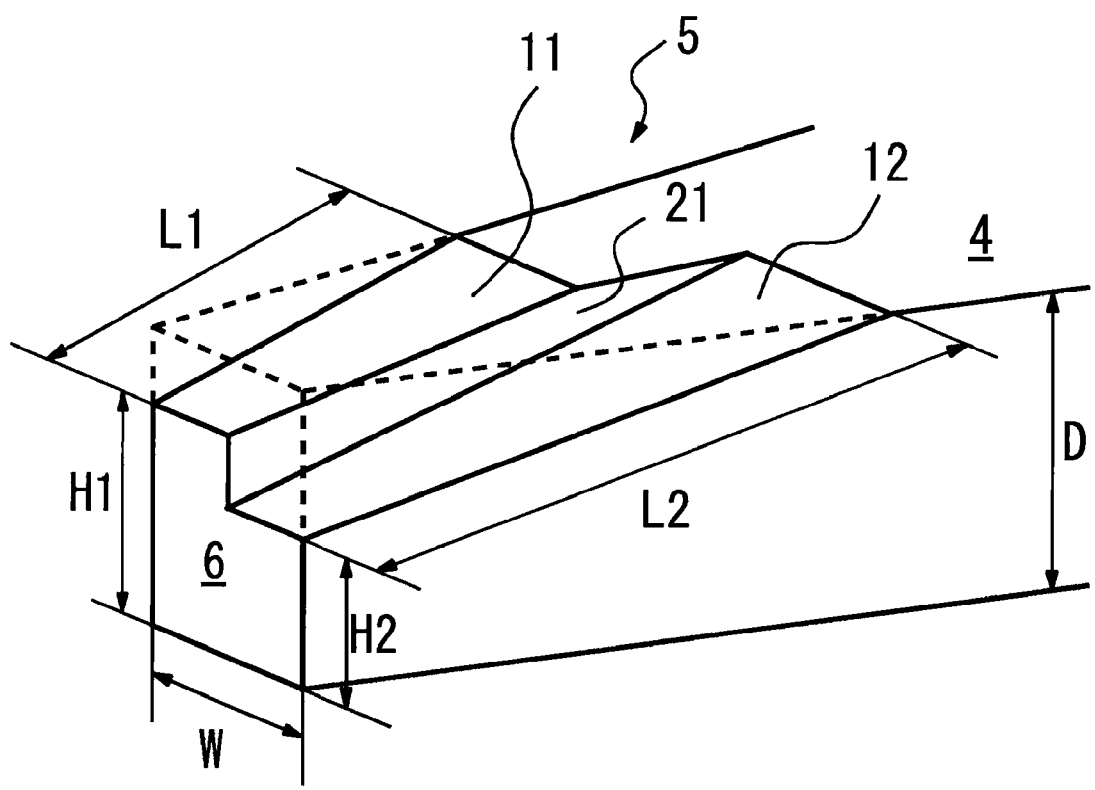
FIG. 1b is a view showing an acute angle portion in the present invention.

FIG. 1b is a view showing the acute angle portion 5 of the block 4. Broken lines denote the shape of the acute angle portion 5 that is not chamfered. At an end 6 of the acute angle portion 5, a height H1 of the first chamfered surface 11 is higher than a height H2 of the second chamfered surface 12. On the other hand, a length L1 of the first chamfered surface 11 is shorter than a length L2 of the second chamfered surface 12.

Therefore, as long as the volume of the chamfered part is the same compared with a case where the acute angle portion 5 is chamfered by one surface, the pneumatic tire has the same uneven wear resistance property. Furthermore, the first chamfered surface 11 and the second chamfered surface 12 have different heights and a step shape is formed by the chamfered surfaces 11 and 12 and a connecting surface that connects these chamfered surfaces. This step shape lets the air flow in the grooves 2 and 3 to be disturbed, thereby enabling to reduce air columnar resonance noise level.

With shear effect caused by the step shape, self-cleaning property when traveling on muddy road is improved. Also, since the chamfered surfaces are in a step shape on the tire surface, phase difference is generated in striking sound caused by tire rotation to prevent increase in pitch noise, thereby enabling to reduce pattern noise.

With depths of the grooves 2 and 3 which form the acute angle portion 5 defined as D (which is also a height of the non-chamfered part of the acute angle portion 5), it is preferred that height difference $\Delta H = H1 - H2$ between the adjacent chamfered surfaces is 7 to 25% of D and length difference $\Delta L = L2 - L1$ between the adjacent chamfered surfaces is 20 to 120% of D. In the case where $\Delta H$ is less than 7% of D or $\Delta L$ is less than 20% of D, the effect of disturbing the air flow in the grooves 2 and 3 is deteriorated, which may be unable to reduce air columnar resonance noise level. In contrast, in the case where $\Delta H$ exceeds 25% of D or $\Delta L$ exceeds 120% of D, the difference in rigidity of each portion formed into a step shape is increased, resulting in lower effect of preventing uneven wear.

It is preferred that a height $Hmax = H1$ of the highest chamfered surface 11 is 7 to 67% of D and a length $Lmin = L1$ of the shortest chamfered surface 11 is 50 to 100% of D. In case where the height Hmax exceeds 67% of D or the length Lmin is less than 50% of D, the effect of chamfering is insufficient, which may cause uneven wear to occur. On the other hand, in the case where the height Hmax is less than 7% of D or the length Lmin exceeds 100% of D, it may be unable to ensure the appropriate height difference $\Delta H$ between the chamfered surfaces and the appropriate length difference $\Delta L$ between the chamfered surfaces as described above.

From the standpoint of preventing chips and tearing at the end 6 of the acute angle portion 5, the width W at the end 6 is preferably not less than 0.6 mm. It is noted that the width W may be more than 0.6 mm and the upper limit of the width W can be arbitrarily determined depending on the shape of the acute angle portion 5.

Figure 2:
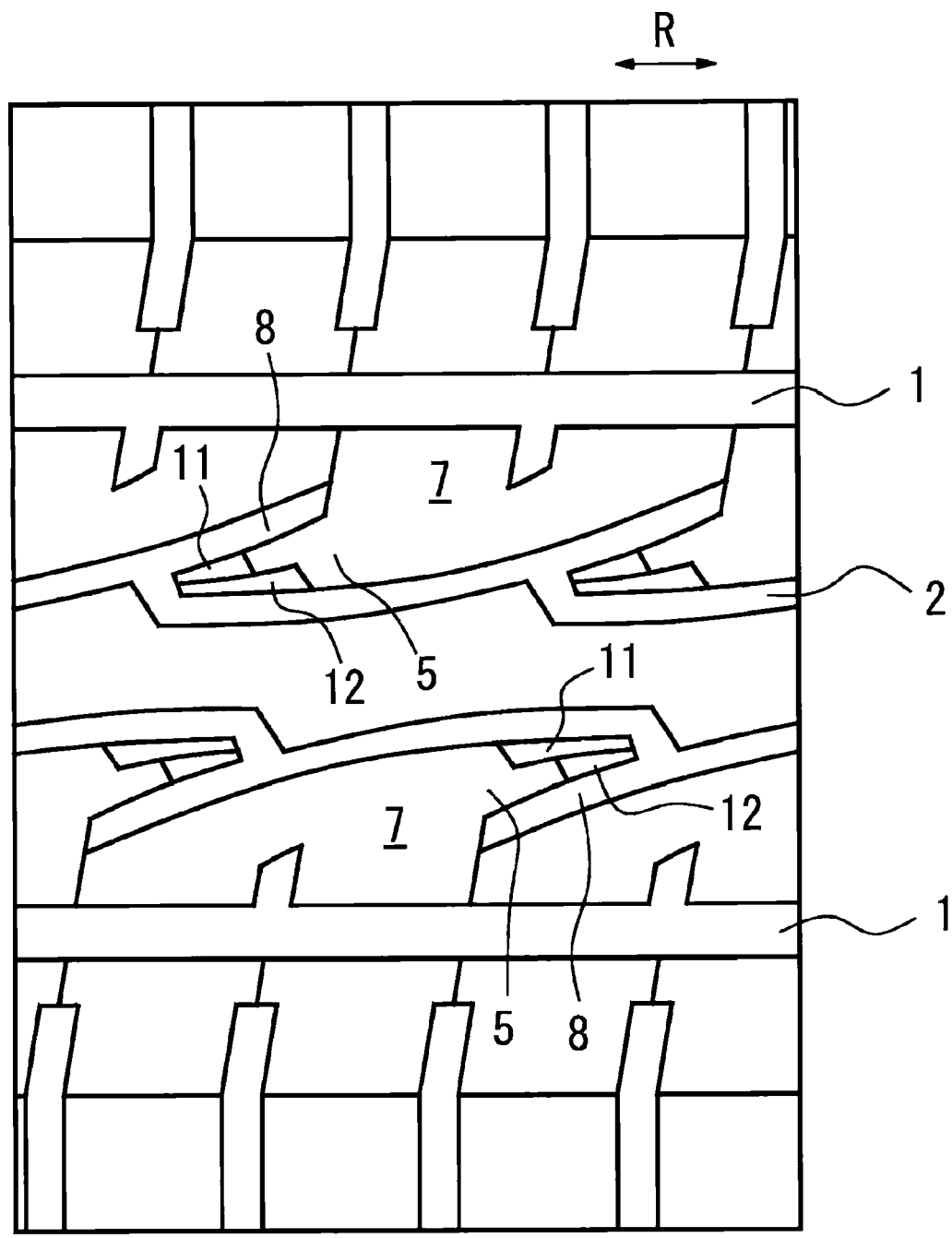
FIG. 2 is a view showing a tread pattern of the pneumatic tire related to the present invention.

The effect of the present invention can also be obtained in the pneumatic tire having a rib pattern as shown in FIG. 2. In FIG. 2, there are ribs 7 formed by circumferential grooves 1 and 2 extending in the circumferential direction R and lug grooves 8 further formed, in which the circumferential groove 2 and the lug groove 8 form an acute angle portion 5. The acute angle portion 5 is chamfered by the first chamfered surface 11 and the second chamfered surface 12, thereby making it possible to obtain the above effect.

Figure 3:
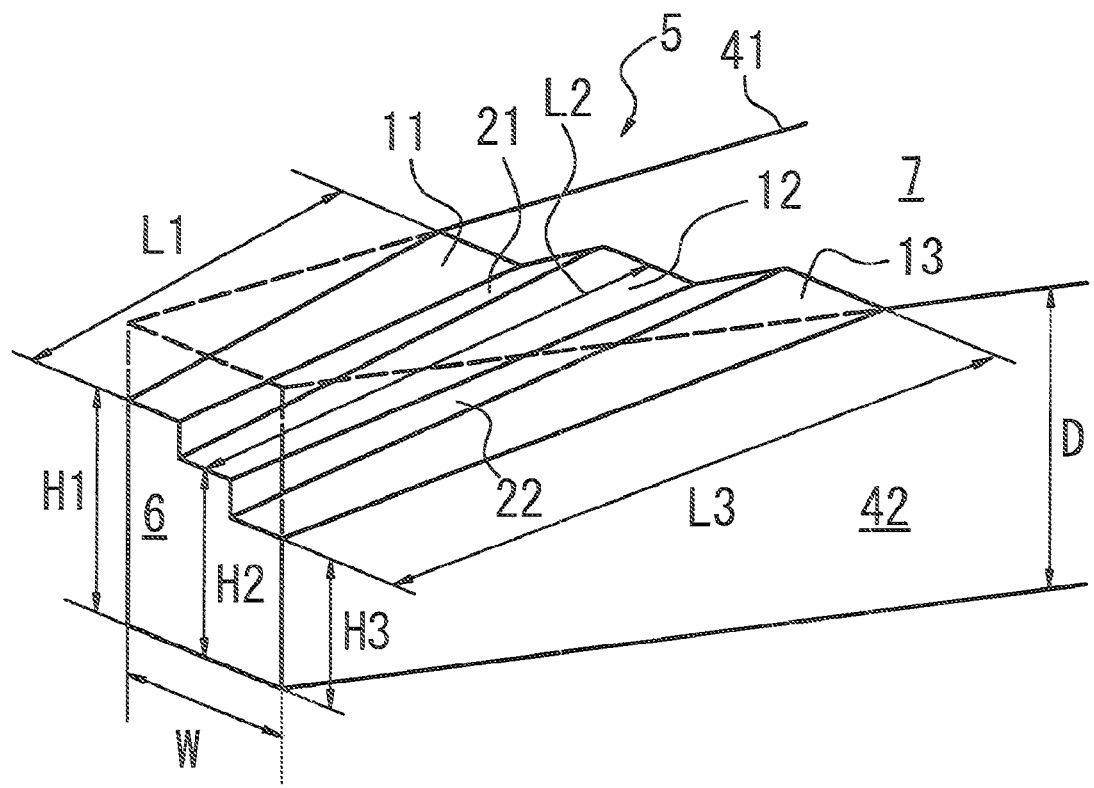
FIG. 3 is a view showing an acute angle portion in the present invention.

Furthermore, chamfered surfaces can be added more. For example, as shown in FIG. 3, the acute angle portion 5 can be chamfered by three chamfered surfaces such as the first chamfered surface 11, the second chamfered surface 12 and the third chamfered surface 13. Since a step shape is formed by the three chamfered surfaces 11 to 13 and connecting surfaces 21 and 22, air columnar resonance noise level can be reduced.

In this case, at the end 6 from one sidewall 41 to the other sidewall 42 of the acute angle portion 5, heights H1 to H3 of the respective chamfered surfaces 11 to 13 are gradually decreased, while lengths L1 to L3 of the respective chamfered surfaces 11 to 13 are gradually increased. More specifically, at the end 6 of the acute angle portion 5, the height of the first chamfered surface 11 is defined as H1, that of the second chamfered surface as H2 and that of the third chamfered surface 13 as H3 in the descending order of height, and the length of the first chamfered surface 11 is defined as L1, that of the second chamfered surface 12 as L2 and that of the third chamfered surface 13 as L3 in the ascending order of height.

As already described, it is preferred that the height $Hmax = H1$ of the highest chamfered surface 11 is set to 7 to 67% of D and the length $Lmin = L1$ of the shortest chamfered surface 11 is set to 50 to 100% of D. It is preferred that height difference $\Delta H = H1 - H2$, $H2 - H3$ between the adjacent chamfered surfaces is 7 to 25% of D and length difference $\Delta L = L3 - L2$, $L2 - L1$ between the adjacent chamfered surfaces is 20 to 120% of D. It is noted that $H1 - H2$ and $H2 - H3$ may not be equal to each other and $L3 - L2$ and $L2 - L1$ may not be equal to each other. Also, number of chamfered surfaces can be set to 4 or more as long as height difference $\Delta H$ between the adjacent chamfered surfaces and length difference $\Delta L$ between the adjacent chamfered surfaces are within the above range.

EXAMPLE

Figure 4A:
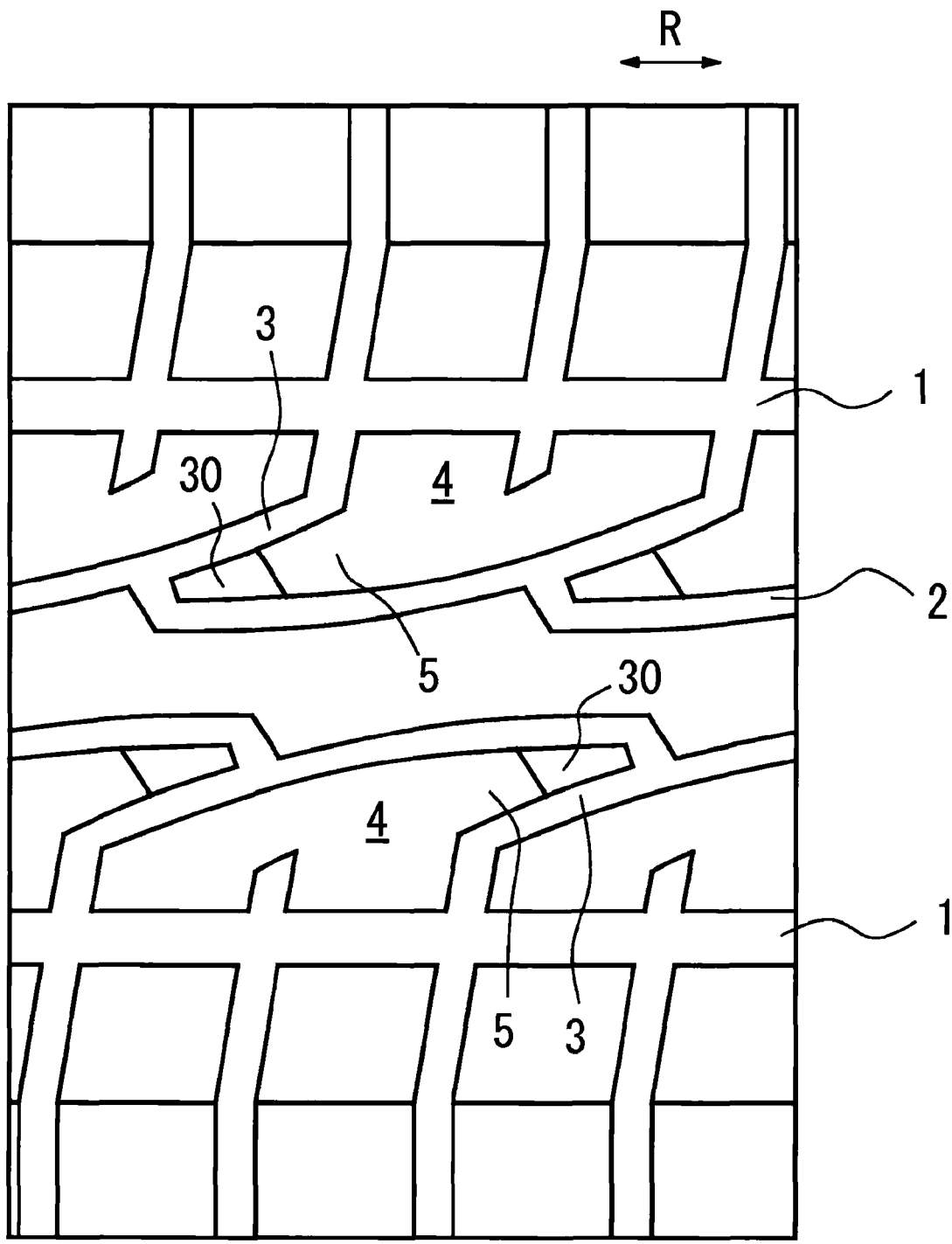
FIG. 4a is a view showing a tread pattern of the pneumatic tire related to Comparative Examples.
Figure 4B:
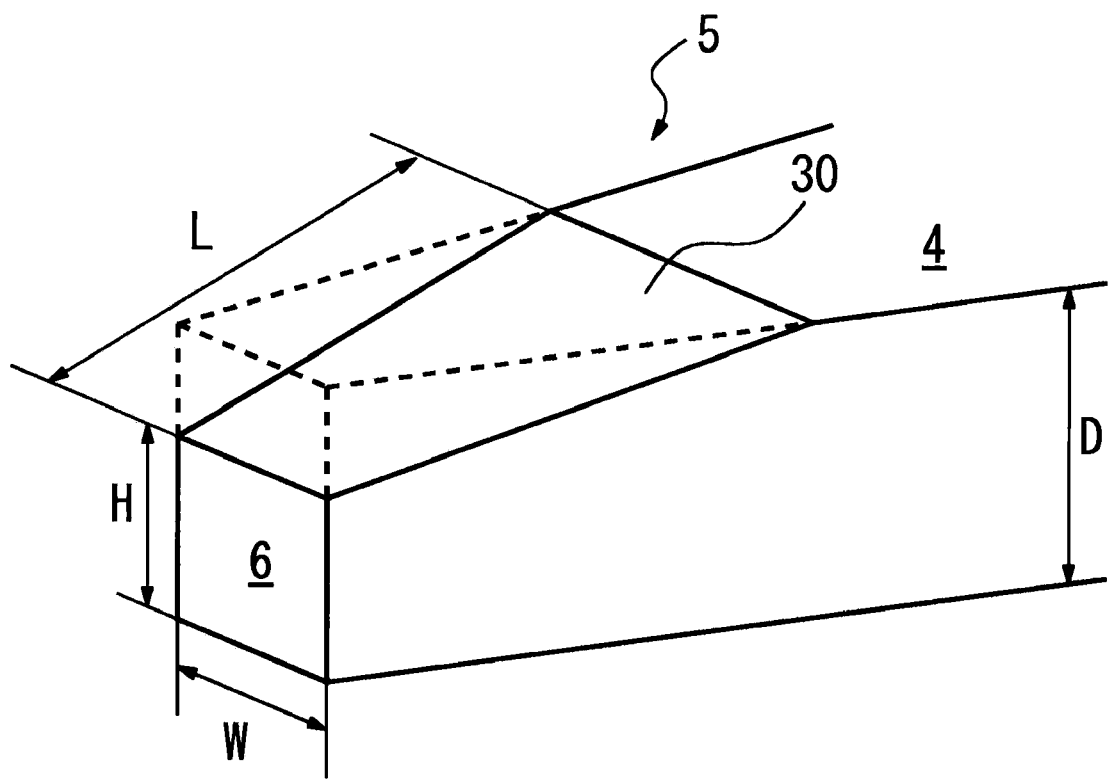
FIG. 4b is a view showing an acute angle portion in Comparative Examples.

Tires of Examples and Comparative examples according to the present invention were manufactured and evaluated, respectively. Tires of Examples have a pattern as shown in FIG. 1a. The tires of Examples 1 to 4 comprise acute angle portions as shown in FIG. 1b and those of Examples 5 to 7 comprise acute angle portions as shown in FIG. 3, respectively. The tires of Comparative Examples comprise a pattern as shown in FIG. 4a and acute angle portions chamfered by one chamfered surface 30, as shown in FIG. 4b. In the tires of Comparative Examples 1 and 2, the acute angle portions are chamfered by one chamfered surface having chamfer height H1 and chamfer length L1 of Examples 1 and 2, respectively. Evaluation was made on tires having a tire size of LT265/75R16 at an air pressure of 420 kPa. Any dimension of the acute angle portion, which is shown in Table 1, is expressed in ratio relative to the groove depth D.

In Table 1, air columnar resonance noise represents the value obtained by measuring the noise level of air columnar resonance noise (of 700 to 1400 Hz) using an in-room acoustic drum tester based on JASO C606 when the tire is brand-new and it is expressed in indices with the value of Comparative example 1 set as 100. As numerical value gets larger, it shows that the level of air columnar resonance noise is lower. In other tests, evaluation was made on tires installed on a diesel engine four-wheel-drive truck of 6600 cc displacement.

Pitch noise is the value obtained by sensory evaluation of pitch noise when tires were traveled on general road surface, which is expressed in indices with the value of Comparative Example 1 set as 100. As numerical value gets larger, it shows that the level of pitch noise is lower. The self-cleaning property is the value obtained by measuring the degree of removed mud from the acute angle portion after traveling on muddy road, which is expressed in indices with the value of Comparative Example 1 set as 100. As numerical value gets larger, it shows better self-cleaning property. Uneven wear resistance is the value obtained by measuring the amount of height difference between the acute angle portion and the tread surface opposed thereto across the groove after traveling 12000 km, which is expressed in indices with the value of Comparative example 1 set as 100. As numerical value gets larger, it shows better uneven wear resistance.

According to Table 1, the tires of Examples showed uneven wear resistance equivalent to the tire of Comparative Example 1. In addition, air columnar resonance noise and pitch noise were reduced, thereby showing better self-cleaning property.

TABLE 1

| | | Example 1 | Example 2 | Example 3 | Example 4 | Example 5 | Example 6 | Example 7 | Comparative Example 1 | Comparative Example 2 |
|---|---|---|---|---|---|---|---|---|---|---|
| Acute angle portion of Examples (ratio with respect to depth D of groove: %) | Height H1 | 21 | 7 | 67 | 67 | 87 | 67 | 67 | — | — |
| | Height H2 | 7 | 0 | 42 | 60 | 67 | 42 | 60 | — | — |
| | Height H3 | — | — | — | — | 47 | 17 | 53 | — | — |
| | Length L1 | 40 | 50 | 100 | 100 | 60 | 100 | 100 | — | — |
| | Length L2 | 60 | 70 | 220 | 120 | 100 | 220 | 120 | — | — |
| | Length L3 | — | — | — | — | 140 | 340 | 140 | — | — |
| Acute angle portion of Examples (mm) | Width W | 0.6 | 0.6 | 0.6 | 0.6 | 0.6 | 0.6 | 0.6 | — | — |
| Acute angle portion of Comparative Examples (ratio with respect to depth D of groove: %) | Height H | — | — | — | — | — | — | — | 7 | 67 |
| | Length L | — | — | — | — | — | — | — | 50 | 100 |
| Acute angle portion of Comparative Examples (mm) | Width W | — | — | — | — | — | — | — | 0.6 | 0.6 |
| Air columnar resonance noise | | 110 | 107 | 105 | 108 | 110 | 107 | 110 | 100 | 98 |
| Pitch noise | | 105 | 105 | 108 | 105 | 115 | 111 | 108 | 100 | 93 |
| Self-cleaning property | | 110 | 107 | 105 | 105 | 109 | 105 | 105 | 100 | 109 |
| Uneven wear resistance | | 103 | 100 | 98 | 95 | 105 | 100 | 98 | 100 | 90 |

Depth D of groove: 12.7 mm

What is claimed is:

1. A pneumatic tire with grooves formed in a tread and land portions each having an acute angle portion formed by said grooves,
   wherein said acute angle portion is chamfered by a plurality of chamfered surfaces to form into a step shape by at least one connecting surface that connects adjacent chamfered surfaces,
   wherein the height of each chamfered surface gradually decreases along its length, but does not decrease sufficiently to meet a groove bottom, the lengths of adjacent chamfered surfaces gradually increase from one to the next at an end of said acute angle portion and terminate at a planar surface vertical to the tread, and
   wherein the chamfered surfaces also extend from an upper surface of the tire land portion in a groove depth direction, but do not extend to the groove bottom.

2. A pneumatic tire with grooves formed in a tread and land portions each having an acute angle portion formed by said grooves,
   wherein said acute angle portion is chamfered by a plurality of chamfered surfaces to form into a step shape by at least one connecting surface that connects adjacent chamfered surfaces,
   wherein with a depth of said groove set as D, a height Hmax of the highest chamfered surface is 7 to 67% of D and a length Lmin of the shortest chamfered surface is 50 to 100% of D, a difference ΔH in height between the adjacent chamfered surfaces is 7 to 25% of D, a difference ΔL in length between the adjacent chamfered surfaces is 20 to 120% of D, and a width W at the end of said acute angle portion is not less than 0.6 mm, and
   wherein the chamfered surfaces each terminate at a planar surface vertical to the tread and the height of each chamfered surface is above a groove bottom at an end portion of the land portions.

3. A pneumatic tire with grooves formed in a tread and land portions each having an acute angle portion formed by said grooves,
   wherein said acute angle portion is chamfered by a plurality of chamfered surfaces to form into a step shape by at least one connecting surface that connects adjacent chamfered surfaces,
   wherein the height of each chamfered surface gradually decreases along its length, but does not decrease sufficiently to meet a groove bottom, and the lengths of adjacent chamfered surfaces gradually increase from one to the next at an end of said acute angle portion and terminate at a planar surface vertical to the tread, and
   wherein with a depth of said groove set as D, a height Hmax of the highest chamfered surface is 7 to 67% of D and a length Lmin of the shortest chamfered surface is 50 to 100% of D, a difference ΔH in height between the adjacent chamfered surfaces is 7 to 25% of D, a difference ΔL in length between the adjacent chamfered surfaces is 20 to 120% of D, and a width W at the end of said acute angle portion is not less than 0.6 mm.

* * * * *